US011971340B1

(12) United States Patent
Liu et al.

(10) Patent No.: US 11,971,340 B1
(45) Date of Patent: Apr. 30, 2024

(54) METHOD FOR PREDICTING LATTICE DEFECT IN METAL-ORGANIC FRAMEWORK MEMBRANE

(71) Applicant: NANJING TECH UNIVERSITY, Jiangsu (CN)

(72) Inventors: Gongping Liu, Jiangsu (CN); Guozhen Liu, Jiangsu (CN); Wanqin Jin, Jiangsu (CN)

(73) Assignee: NANJING TECH UNIVERSITY, Jiangsu (CN)

( * ) Notice: Subject to any disclaimer, the term of this patent is extended or adjusted under 35 U.S.C. 154(b) by 0 days.

(21) Appl. No.: 18/498,064

(22) Filed: Oct. 31, 2023

(30) Foreign Application Priority Data

Nov. 24, 2022 (CN) .......................... 202211479458.0

(51) Int. Cl.
| | |
|---|---|
| *G01N 15/08* | (2006.01) |
| *B01D 65/10* | (2006.01) |
| *B01D 71/00* | (2006.01) |
| *B01D 71/02* | (2006.01) |
| *C07F 7/00* | (2006.01) |

(52) U.S. Cl.
CPC ............ *G01N 15/08* (2013.01); *B01D 65/10* (2013.01); *B01D 71/028* (2013.01); *C07F 7/00* (2013.01); *G01N 2015/084* (2013.01)

(58) Field of Classification Search
CPC .. G01N 15/00; G01N 15/08; G01N 2015/084; B01D 65/00; B01D 65/10; B01D 71/00; B01D 71/02–06; B01D 71/028; C07F 7/00
See application file for complete search history.

(56) References Cited

FOREIGN PATENT DOCUMENTS

| CN | 112381270 A | * | 2/2021 | ............. G06F 30/20 |
| CN | 112927769 A | * | 6/2021 | ............. G16C 10/00 |

OTHER PUBLICATIONS

Machine Translation for CN 112381270 A (Year: 2021).*
Machine Translation for CN 112927769 A (Year: 2021).*

* cited by examiner

*Primary Examiner* — Nguyen Q. Ha
(74) *Attorney, Agent, or Firm* — JCIPRNET (57) ABSTRACT

The present disclosure provides a method for predicting a lattice defect in a metal-organic framework (MOF) membrane. The method comprises acquiring a number n of a ligand during preparation of the MOF membrane, and acquiring a theoretical number m of connections formed between a core secondary building unit and a surrounding secondary building unit; setting a number of collisions of the ligand with the core secondary building unit and the surrounding secondary building unit; and calculating an expected value of a number of connections formed on lattices based on a collision probability, wherein the number of collisions is 1 or 2.

4 Claims, 11 Drawing Sheets

METHOD FOR PREDICTING LATTICE DEFECT IN METAL-ORGANIC FRAMEWORK MEMBRANE

CROSS-REFERENCE TO RELATED APPLICATION

This application claims the priority benefit of China application serial no. 202211479458.0, filed on Nov. 24, 2022. The entirety of the above-mentioned patent application is hereby incorporated by reference herein and made a part of this specification.

TECHNICAL FIELD

The present disclosure relates to a method for predicting a lattice defect in a metal-organic framework (MOF) membrane, and belongs to the technical field of membrane separation.

BACKGROUND

MOF materials have an adjustable pore structure and an ultra-high specific surface area (SSA), and are ideal membrane materials. Although more than 10,000 MOF materials have been discovered, less than 1% of the MOF materials can be successfully prepared into continuous polycrystalline membranes. A key problem is the elimination of defects during formation of an MOF membrane, including intercrystalline defects (such as micro/nano-scale cracks) and lattice defects (such as ligand or cluster missing). Over the past decade, the intercrystalline defects have been well addressed by optimizing a synthesis formulation. Although the regulation of lattice defects has been proved in various applications such as storage and catalysis, these fields focus on creating defects through a strategy such as controlling synthesis conditions or a post-treatment (such as metal cation substitution and ligand modification). However, in the field of molecular separation, the presence of lattice defects at an atomic scale is not conducive to efficient size sieving. How to identify and eliminate these defects is still a huge challenge.

Another key problem is the stability of a lattice structure of an MOF membrane in use. So far, zeolitic imidazolate frameworks (ZIFs), the most widely studied MOF membrane materials, have exhibited excellent separation performance in gas separation. However, due to weak bonding between $Zn^{2+}$ and 4 imidazolate ligands, ZIFs have poor water stability, which hinders the wide application of ZIFs and especially the application of ZIFs in liquid separation. An MOF with a high coordination number can be constructed by linking a high-valence metal ion such as $Zr^{4+}$ to 8 to 12 ligands, which can significantly improve the water stability. However, compared with MOFs with a low coordination number, MOFs with a high coordination number are more likely to lose ligands during formation to produce lattice defects, which further sacrifices the inherent molecular-sieving performance.

The above two problems both are related to lattice defects in MOFs. Therefore, how to predict lattice defects during preparation is conducive to preparation of a high-quality MOF membrane material.

SUMMARY

The present disclosure provides a method for predicting a lattice defect in an MOF membrane material based on a high-probability theoretical coordination strategy.

In addition, based on the high-probability theoretical coordination strategy, lattice defects in an MOF membrane can be eliminated by increasing a number of ligands and increasing a probability of collision between the ligands and metal clusters to overcome a potential energy between the ligands and the metal clusters.

In the present disclosure, a series of high-connection-number Zr-fcu-MOF membranes each with an angstrom-scale lattice pore size are also successfully prepared, and the membranes can exhibit ultra-high and stable molecular-sieving performance in gas, water desalination, and organic solvent azeotrope separation systems.

A method for predicting a lattice defect in an MOF membrane is provided, including the following steps:

acquiring a number n of a ligand during preparation of the MOF membrane, and acquiring a theoretical number m of connections formed between a core secondary building unit (SBU) and a surrounding SBU;

setting a number of collisions of the ligand with the core SBU and the surrounding SBU; and calculating an expected value of a number of connections formed on lattices based on a collision probability;

where the number of collisions is 1 or 2;

when the number of collisions is 1, the expected value of the number of connections is calculated by the following formula:

$$P(k) = \frac{C_m^k C_{n-1}^{k-1}}{C_{m+n-1}^{m-1}}, 1 \leq k \leq m$$

$$E(k) = \sum_{k=1}^{m} kP(k), 1 \leq k \leq m$$

where k represents an actual number of connections formed between the core SBU and the surrounding SBU of the MOF membrane when the number of collisions is 1; and when the number of collisions is 2, the expected value of the number of connections is calculated by the following formula:

$$\tilde{P}(L) = \sum_{k \leq L} P(k) W(k) = \sum_{k \leq L} \frac{C_m^k C_{n-1}^{m-1}}{C_{n+m-1}^{m-1}} \times \frac{C_{m-k}^{L-k} C_{n-1}^{L-1}}{C_{n-k+m-1}^{m-1}}, 1 \leq k \leq L \leq m$$

$$\tilde{E}(L) = \sum_{L=1}^{m} L\tilde{P}(L), 1 \leq k \leq L \leq m$$

where L represents an actual number of connections formed between the core SBU and the surrounding SBU of the MOF membrane when the number of collisions is 2.

The MOF membrane is formed from an MOF material.

The MOF material is selected from a group consisting of IRMOF-series materials, ZIF-series materials, CPL-series materials, MIL-series materials, PCN-series materials, and UiO-series materials.

An n/m ratio is in a range from 0.5 to 50.

A preparation method of an MOF membrane is provided, including the following steps:

step 1: dissolving a zirconium salt in a solvent and dissolving a ligand in a solvent to obtain a zirconium salt solution and a ligand solution respectively; and step 2: allowing the zirconium salt solution and the ligand solution to contact two sides of a porous substrate, respectively, and heating to allow a reaction, to obtain the MOF membrane.

The ligand is added at an amount that is 0.5 to 50 times a ligand amount according to a ligand/metal salt stoichiometric ratio during MOF crystal synthesis.

The zirconium salt is zirconium oxychloride.

The ligand is selected from the group consisting of terephthalic acid (TPA), 2,5-dihydroxyterephthalic acid (DHTA), and fumaric acid.

The porous substrate is selected from the group consisting of a porous ceramic material and a porous polymer material.

The reaction is conducted at 40° C. to 80° C. for 4 h to 12 h.

A use of the prepared MOF membrane in a gas or liquid separation process is provided.

Beneficial Effects

The present disclosure proposes a high-probability theoretical coordination strategy, where a ligand is used in excess to increase a probability of collision of the ligand with metal clusters, thereby overcoming a barrier potential between the linked ligand and the metal clusters to eliminate lattice defects in an MOF membrane. Results show that, when a number of connections is close to a theoretical value, a resulting high-connection-number MOF membrane exhibits high stability and accurate size-sieving performance in gas, desalination, and organic solvent azeotrope separation processes. The high-probability theoretical coordination strategy proposed by the present disclosure can allow the manipulation of a lattice defect content in a crystal, and create a new way for construction at an atomic scale and regulation of a nano-space that plays a key role in fields such as molecular separation, catalysis, and storage.

DETAILED DESCRIPTION OF THE EMBODIMENTS

1. Experimental Materials

Zirconium oxychloride octahydrate (ZrOCl$_2$·8H$_2$O); TPA (bdc, C$_8$H$_6$O$_4$); DHTA (bdc(OH)$_2$, C$_8$H$_6$O$_6$); DMC (C$_3$H$_6$O$_3$); fumaric acid (fum, C$_4$H$_4$O$_4$, 99%); acetic acid, formic acid, and methanol; N,N-dimethylformamide (DMF, C$_3$H$_7$NO); support polyacrylonitrile (PAN), polytetrafluoroethylene (PTFE), polyvinylidene fluoride (PVDF), and nylon; yttria-stabilized zirconia (YSZ) hollow fibers, and ceramic sheets (Al$_2$O$_3$) and tubes (ZrO$_2$/Al$_2$O$_3$), homemade; and ionized water, homemade.

2. Preparation of MOF Membranes 2.1 Preparation of an MOF Membrane without Excess Ligand A Zr-fcu-MOF membrane was prepared on a ceramic support by a hydrothermal method (where a ligand/SBU molar ratio was 1).

For a Zr-fum-MOF membrane, 5.8 g of fumaric acid and 16.1 g of zirconium oxychloride were slowly added to a mixed solution of DMF/formic acid (200 mL/70 mL), and a resulting mixture was stirred for dissolution and then slowly poured into a reactor; an inorganic support (a hollow fiber, a ceramic sheet, or a ceramic tube) was placed in the reactor; and the reactor was heated to 80° C. to allow a reaction for 6 h.

Secondary growth was adopted for preparation of Zr-bdc-MOF and Zr-bdc(OH)$_2$-MOF membranes. The preparation of a Zr-bdc-MOF membrane was taken as an example. Primary growth: 484 mg of zirconium oxychloride and 249 mg of TPA were dissolved in 50 mL of a mixed solution of DMF/formic acid; a ceramic support was placed in the mixed solution; and a reaction was conducted at 100° C. for 12 h. A formed Zr-bdc-MOF membrane was soaked in methanol for 1 h and then vacuum-dried for 6 h. The formed Zr-bdc-MOF membrane was then subjected to secondary growth that was the same as the primary growth.

A preparation process of a Zr-bdc(OH)$_2$-MOF membrane was similar to a preparation process of the Zr-bdc-MOF membrane, only except that the ligand was replaced by DHTA. In addition, MOF particles produced in a solution were collected for characterization during membrane preparation. A solvent exchange was required for the prepared membrane and powder, that is, a prepared sample was rinsed with DMF three times, then washed with methanol three times, soaked in a methanol solution, and finally vacuum-dried at 160° C. for 12 h to obtain an activated MOF membrane or powder.

2.2 Preparation of an MOF Membrane with Excess Ligand

The MOF membrane with excess ligand was prepared by a counter diffusion method.

For Zr-fum-MOF membranes, 484 mg of zirconium oxychloride and a fumaric acid ligand at different contents were separately dissolved in a mixed solvent of water/acetic acid (80 mL/20 mL); resulting solutions were then added to left and right sides of a homemade U-shaped glass membrane-preparation device, respectively, and were separated by a porous substrate; and the device was then placed in an oven to allow a reaction at 40° C. to 80° C. for 4 h to 12 h.

For a Zr-bdc-MOF membrane, 484 mg of zirconium oxychloride and 3.73 g of TPA were separately dissolved in a mixed solvent of DMF/formic acid (40 mL/10 mL); resulting solutions were then poured into two sides of a homemade glass membrane-preparation device and separated by a nylon support; and a reaction was conducted at 80° C. for 6 h.

A preparation process of a Zr-bdc(OH)$_2$-MOF membrane was similar to a preparation process of the Zr-bdc-MOF membrane, only except that the ligand was replaced by DHTA. A solvent exchange process of the prepared membrane was similar to the treatment process of the membrane prepared by the hydrothermal method.

3. Establishment of a Prediction Method

Figure 1:
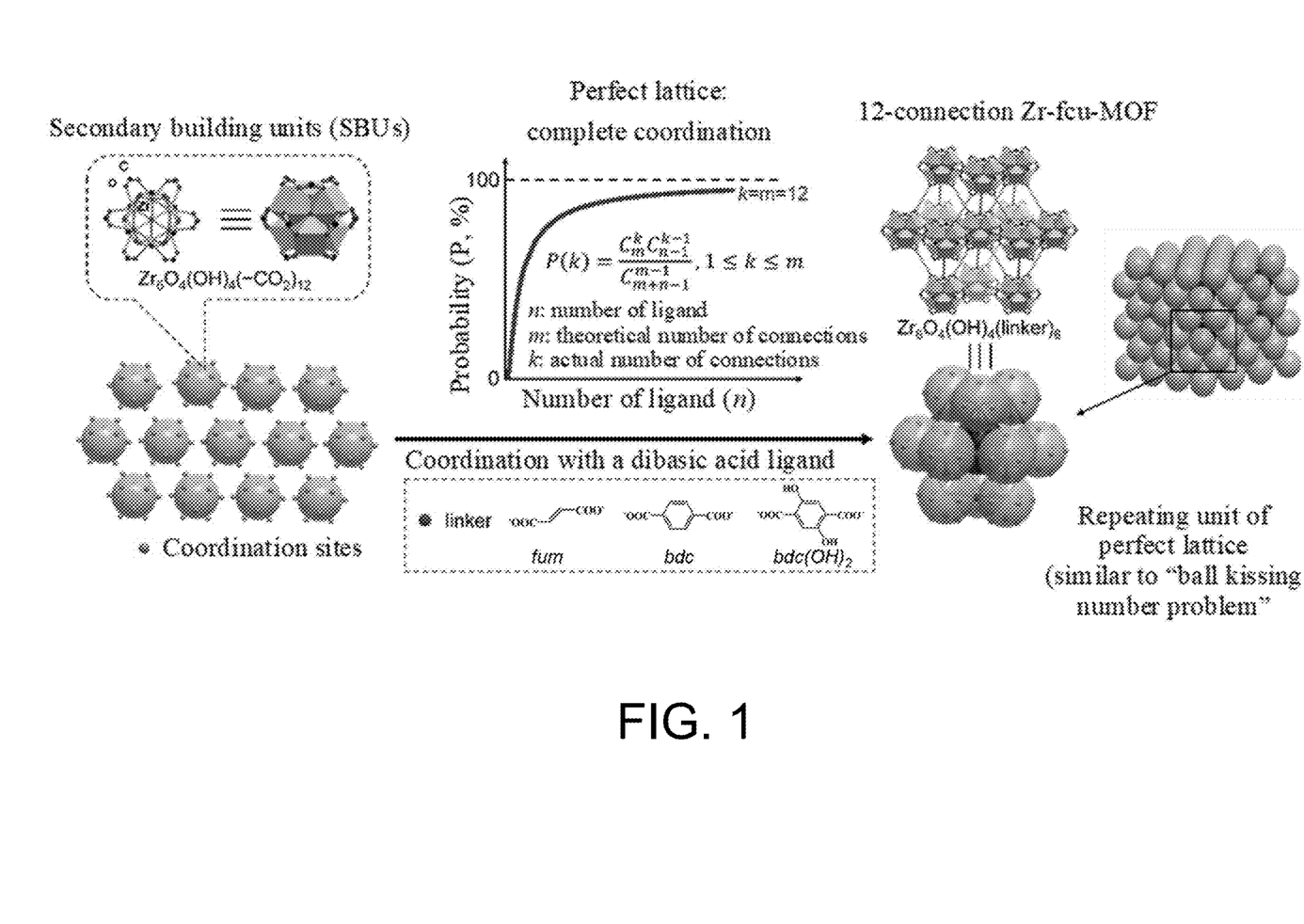
FIG. 1 is a schematic diagram of linking tightly-packed SBUs through ligands to produce an MOF lattice.

In a three-dimensional (3D) space, one ball can contact at most 12 balls of an equal radius to the ball, which is just a maximum number of connections for about 98% of MOFs that have been found (MOFs with more than 12 connections account for only about 2%). For example, Zr-MOF with an fcu topological structure is a typical 12-coordination MOF, which is produced by linking SBU Zr$_6$O$_4$(OH)$_4$(—CO$_2$)$_{12}$ to a dibasic acid ligand. As a reasonable analogy, SBU of Zr-fcu-MOF is set as a sphere, and each SBU is bonded with 12 SBUs to produce a periodic MOF crystal structure (FIG. 1). Actually, bonding (connection) relies on a coordination of a dibasic acid ligand with a pair of sites from core SBU and surrounding SBU. If some bonding points are missed, lattice defects will appear in an MOF crystal. In fact, a contact between a ligand and a coordination pair is random, and thus the realization of a theoretical number of connections through coordinations is a probability event. In FIG. 1, Zr$_6$O$_4$(OH)$_4$(—CO$_2$)$_{12}$ SBUs are coordinated with dibasic acid ligands to produce a 12-coordination Zr-fcu-MOF crystal structure. Similar to the "ball kissing number problem" in a 3D space, it is a tight-stacking manner for SBUs. In this problem, a mathematical model predicts a probability that a specified number of ligands will contact 12 pairs of coordination sites to bond a core SBU with 12 surrounding SBUs to produce an actual number of coordinations.

Based on this, the probability problem of making n ligands contact m pairs of coordination sites for linking a core SBU to surrounding SBUs to produce an MOF crystal repeating unit with a theoretical number m of connections to produce an actual number k of connections is simplified into a probability problem in a typical ball-box model. Pairs of coordination sites are regarded as m boxes and ligands are regarded as n balls. It is assumed that probabilities of assignment of the balls in each box are the same, and a coordination reaction ends after two collisions between a ligand and a pair of coordination sites. For clarity, it is assumed that the boxes are different and the balls are identical. A process of making a ligand bind to a pair of coordination sites can be regarded as a process of assigning a ball into a box, and a box is allowed to be empty. Thus, a probability of an actual number k of connections can be simplified into a probability that k boxes are assigned with a ball. A method to solve this problem is as follows:

First Contact:

For assigning n identical balls to m different boxes, a total number of assignment schemes is $C_{m+n-1}^{m-1}$. In fact, if it is assumed that there are m non-existent virtual balls and then the virtual balls are placed one by one in m visible boxes, then there is only one assignment scheme. n identical balls are assigned to m different boxes, and an empty box is allowed. This result is equivalent to assigning n+m virtual balls to m existing boxes without an empty box. This assignment can also be allowed by inserting m−1 partitions into n+m−1 gaps among n+m balls, and a total number of assignment schemes is $C_{m+n-1}^{m-1}$. All assignment schemes can be understood according to the following steps:

(1) 1 box is assigned with balls. This is equivalent to assigning n identical balls to 1 box among m different boxes. A number of schemes to select 1 box from the m boxes is a, and a number of schemes to assign the n balls to the 1 box is 1. Therefore, a number of schemes to assign 1 box with balls is $C_m^1 \times 1 = C_m^1$.

(2) 2 boxes are assigned with balls. This is equivalent to assigning n identical balls to 2 boxes among m different boxes. A number of schemes to select 2 boxes from the m boxes is $C_m^2$, and a number of schemes to assign the n balls to the 2 boxes without an empty box is $C_{n-1}^{2-1}$, which is equivalent to inserting 2−1 partitions into n−1 gaps among the n balls. Therefore, a number of schemes to assign 2 boxes with balls is $C_m^2 \times C_{n-1}^{2-1} = C_m^2 \times C_{n-1}^{2-1}$.

(3) k boxes are assigned with balls. This is equivalent to assigning n identical balls to k boxes among m different boxes, where none of the k boxes is allowed to be empty. Just like step (2), a number of schemes to assign k boxes with balls is $C_m^k \times C_{n-1}^{k-1}$.

Therefore, a probability P(k) of a number k of connections (that is, k boxes are assigned with balls) can be calculated by the following formula:

$$P(k) = \frac{\text{Number of schemes to assign balls to } k \text{ boxes}}{\text{Total number of schemes to assign } n \text{ balls to } m \text{ boxes}} = \frac{C_m^k C_{n-1}^{k-1}}{C_{m+n-1}^{m-1}},$$

$$1 \le k \le m \quad C_{m+n-1}^{m-1} = \sum_{k=1}^{m} C_m^k C_{n-1}^{k-1}$$

can be verified.

An expected number E(k) of connections can be calculated by the following formula:

$$E(k) = \sum_{k=1}^{m} kP(k), \ 1 \le k \le m.$$

For example, if m=12 and n=240, an expected number of connections is:

$$E(k) = \sum_{k=1}^{m} kP(k) = 1 \times P(1) + 2 \times P(2) + \ldots + 12 \times P(12) = 11.5.$$

In the mathematical model established here, 12 ligands are required to allow a theoretical number of connections, that is, m=12, to allow a stoichiometric ratio of an MOF chemical structure. Thus, the use of 240 ligands means that a stoichiometric number of the ligands is multiplied by 20 (n/12=240/12=20), which is equivalent to a fact that the ligand is used in an amount that is 20 times a ligand amount according to the ligand/SBU stoichiometric ratio in the experiment to synthesize an MOF membrane.

Second Contact:

To obtain a probability of a number L of connections after the second contact, a ball is assigned to a box twice, and a probability that exactly L boxes are assigned with balls is calculated. It is assumed here that, during the first contact, only one ball remains in a box, and the remaining assigned balls are released and re-assigned (this is consistent with a coordination process).

It is assumed that L boxes are assigned with balls after the second contact, k boxes are assigned with balls after the first contact, and 1≤k≤L, L–k boxes are assigned with balls during the second contact. Therefore, a probability that L boxes are assigned with balls after the two contacts is:

$$\tilde{P}(L) = \sum_{k \le L} P(k) W(L, k)$$

where P(k) refers to a probability that k boxes are assigned with balls after the first contact; and W(L,k) refers to a probability that L–k boxes are assigned with balls during the second contact, and can be calculated through the following analysis:

During the first contact, k boxes are assigned with balls. According to the assumption of the present disclosure, only one ball remains in each box, and the remaining balls are re-assigned. Thus, during the second contact, n–k identical balls are assigned to m different boxes, and an empty box is allowed. A probability that n–k balls are assigned to k boxes during the first contact while there is no empty box among other L–k boxes should be calculated. A total number of assignment schemes to assign n–k balls to m boxes and allowing an empty box is $C_{n-k+m-1}^{m-1}$. In order to assign n–k balls to k boxes and other L–k boxes without an empty box, L–k boxes should be first selected from the remaining m–k boxes (because k boxes have already been assigned with balls during the first contact), and a number of such assignment schemes is $C_{m-k}^{1-k}$; and then other n–k balls are assigned to k boxes during the first contact, and L–k boxes are selected and assigned with balls without an empty box during the second contact. This can be understood that L–k balls are first selected from n–k balls and then assigned one by one to L–k boxes, in which case there is only 1 assignment scheme. Then the remaining n–k–(L–k)=n–L balls are assigned to k+(L–k)=L boxes, and an empty box is allowed, in which case a number of assignment schemes is $C_{n-L+L-1}^{L-1} = C_{n-1}^{L-1}$. Therefore, a probability during the second contact can be calculated by the following formula:

$$W(L, k) = \frac{C_{m-k}^{L-k} C_{n-1}^{L-1}}{C_{n-k+m-1}^{m-1}}.$$

Comprehensively considering the events during the first contact and the second contact, a probability of occurrence of L connections is:

$$\tilde{P}(L) = \sum_{k \le L} P(k) W(k) = \sum_{k \le L} \frac{C_m^k C_{n-1}^{m-1}}{C_{n+m-1}^{m1}} \times \frac{C_{m-k}^{L-k} C_{n-1}^{L-1}}{C_{n-k+m-1}^{m-1}}, \ 1 \le k \le L \le m\ldots$$

An expected number of connections is:

$$\tilde{E}(L) = \sum_{L=1}^{m} L \tilde{P}(L), \ 1 \le k \le L \le m.$$

For example, when m=12 and n=180, an expected number of connections is:

$$\tilde{E}(L) = \sum_{L=1}^{12} L \tilde{P}(L) = 1 \times \tilde{P}(1) + 2 \times \tilde{P}(2) + \ldots + 12 \times \tilde{P}(12) = 11.96.$$

This means that, if 180 ligands (according to the results discussed under the first contact, it is equivalent to a fact that the ligand is used in an amount that is 15 times a ligand amount according to the ligand/SBU stoichiometric ratio to synthesize an MOF membrane) are used, after the two contacts, an expected number of connections for the MOF membrane is 11.96, which is close to a perfect lattice.

The quantification of lattice defects in an MOF membrane is conducted by analysis methods based on NMR and thermogravimetric analysis (TGA) data that are commonly used in the literature. During synthesis of an MOF crystal, a regulator (mainly a monobasic acid) can be coordinated with a metal cluster, resulting in a ligand-missing defect. Therefore, a content of the regulator can be used to quantify a concentration of lattice defects. Based on $^1$H NMR data, a molar ratio of the regulator to the ligand $$\left( y = \frac{M_{mod}}{M_{linker}} \right)$$

can be calculated according to the following formula:

$$y = \frac{M_{mod}}{M_{linker}} = \left(\frac{Mod.1H\ Int.}{N_{HMod}}\right) \times \left(\frac{N_{Hlinker}}{linker1H\ Int.}\right)$$

where $N_{HMod}$ and $N_{Hlinker}$ refer to numbers of $^1H$ protons of NMR signals of the regulator and ligand, respectively. For example, for the ligand TPA, $N_{b,dc}=4$. Mod. 1H Int. and linker 1H Int. refer to intensities of NMR signals of the regulator and ligand, respectively.

Thus, a lattice defect concentration ($C_{def.}$) obtained based on NMR data can be calculated by the following formula:

$$c_{def.} = \frac{M_{mod}}{M_{mod} + M_{linker}} = \frac{y \cdot M_{linker}}{y \cdot M_{linker} + M_{linker}} = \frac{y}{1+y}$$

Characterization of Lattice Defects in a Zr-Fcu-MOF Membrane

Figure 2:
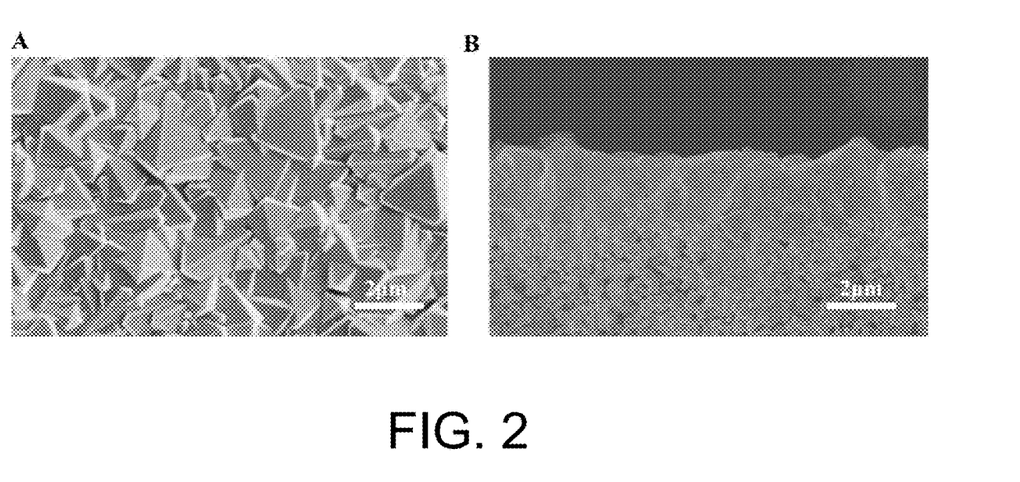
FIG. 2 shows field emission scanning electron microscopy (FESEM) images of a surface A and a cross section B of an interactively-growing Zr-fum-MOF membrane supported by a ceramic sheet.
Figure 3:
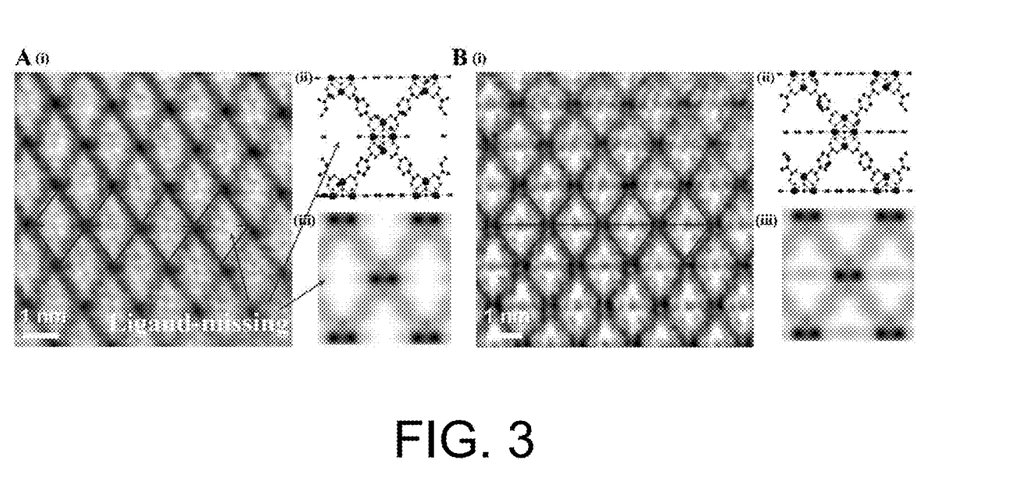
FIG. 3 shows high resolution transmission electron microscopy (HRTEM) images of interactively-growing Zr-bdc-MOF membranes with lattice defects A and without lattice defects B along a direction, respectively, where (i) is a contrast transfer function-correction image, (ii) shows a predicted structure model, and (iii) shows a simulated projection potential.
Figure 4:
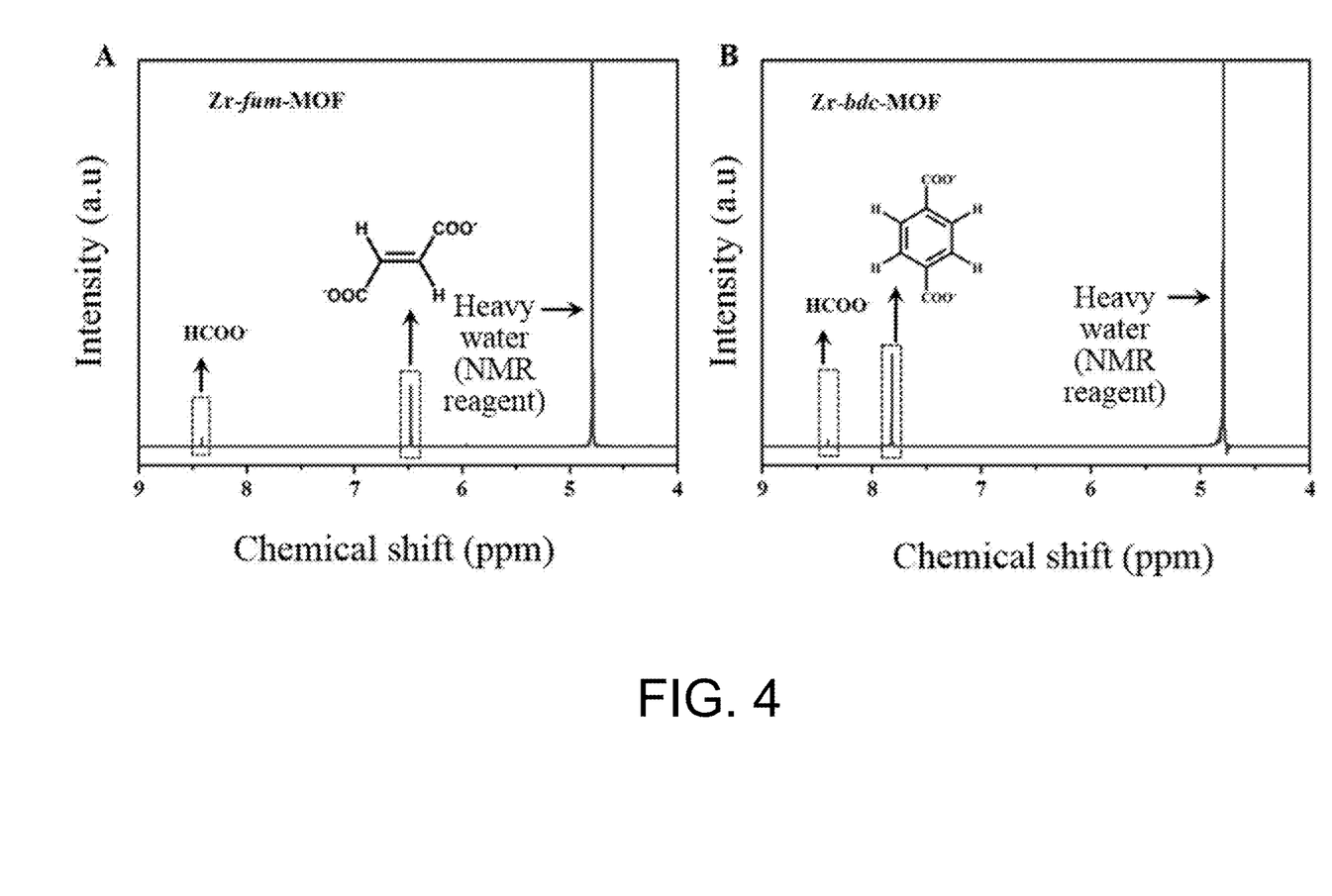
FIG. 4 shows proton nuclear magnetic resonance ($^1$H NMR) spectra of Zr-fum-MOF A and Zr-bdc-MOF B membranes prepared according to the ligand/SBU stoichiometric ratio.

Three typical 12-coordination Zr-fcu-MOFs were investigated, and the three MOFs were Zr-fum-MOF, Zr-bdc-MOF, and Zr-bdc(OH)$_2$-MOF obtained by coordinating three different dibasic acid ligands (fumaric acid (fum), TPA (bdc), and DHTA (bdc-(OH)$_2$)) with SBU Zr$_6$O$_4$(OH)$_4$(—CO$_2$)$_{12}$, respectively. A Zr-fcu-MOF membrane was first synthesized with the stoichiometric ligand and SBU (which was defined as a ligand/SBU stoichiometric ratio for convenience). As shown in FIG. 2, a surface of the prepared Zr-fum-MOF membrane has no intercrystalline defects, and tightly binds to a support. Atomic-scale lattice defects in the prepared continuous MOF membrane (such as ligand-missing and cluster-missing) can be observed by ultra-low-dose HRTEM. Due to poor irradiation resistance of the ligand fumaric acid, it is easy to cause structural collapse under electron beam irradiation. Therefore, Zr-bdc-MOF is selected and observed to determine the presence of structural defects in the membrane. In contrast to an MOF membrane without lattice defects prepared based on a high-probability theoretical coordination strategy (B in FIG. 3), in a structure of an MOF membrane with lattice defects, ligands arranged transversely are missed (A in FIG. 3), which is a typical feature of ligand-missing defects. Cluster-missing lattice defects can hardly be observed by HRTEM due to a relatively-low concentration. NMR characterization results also confirm that lattice defect concentrations in the prepared Zr-fum-MOF and Zr-bdc-MOF membranes are 21.3% and 22.3%, respectively, and corresponding numbers of ligand connections are 9.4 and 9.3, respectively (FIG. 4).

H$_2$/CO$_2$ permeabilities of the Zr-fum-MOF and Zr-bdc-MOF membranes were tested. Permeation selectivities of the two membranes are 4.3 and 3.6, respectively, which are close to a Knudsen diffusion selectivity (4.7) of H$_2$ and CO$_2$.

A ligand is used in excess to increase a probability of collision with coordination pairs on SBUs to eliminate lattice defects in a Zr-fcu-MOF membrane.

Figure 5:
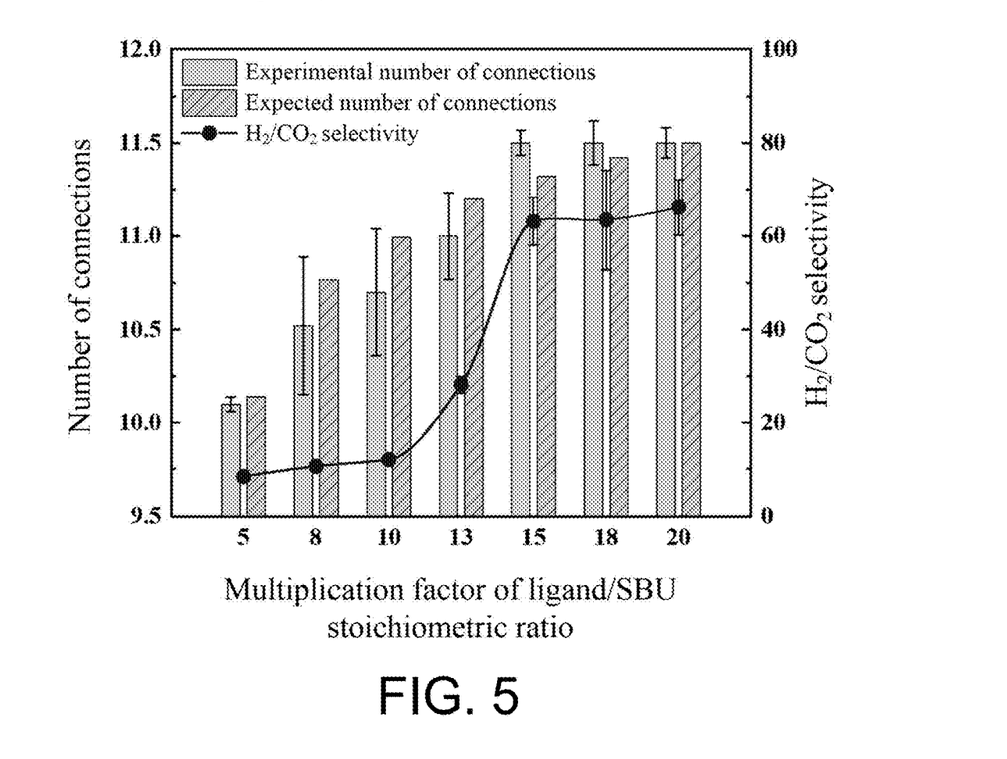
FIG. 5 is a schematic diagram illustrating connection numbers (experimental and expected values) and $H_2/CO_2$ permeation selectivities (transmembrane pressure difference: 1 bar, temperature: 25° C., and mixed molar ratio: 1:1) of Zr-fum-MOF membranes prepared at ligand amounts of different multiplication factors according to the ligand/SBU stoichiometric ratio.
Figure 6:
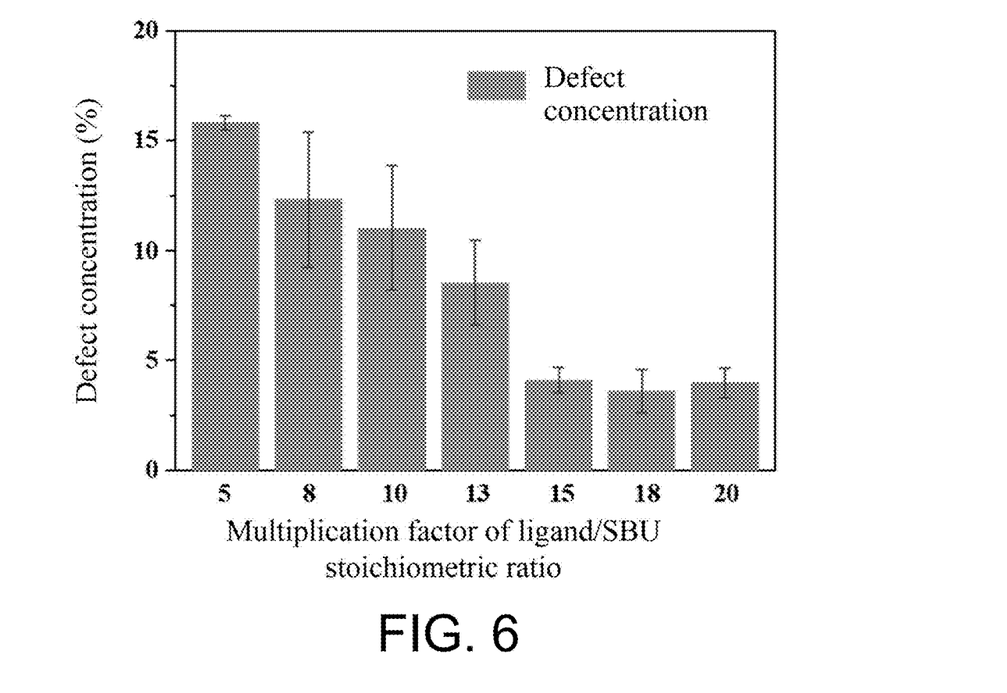
FIG. 6 is a schematic diagram illustrating lattice defect concentrations (based on NMR data) in Zr-fum-MOF membranes prepared at ligand amounts of different multiplication factors according to the ligand/SBU stoichiometric ratio.

As shown in FIG. 5, based on the mathematical probability model proposed in the present disclosure, it is predicted that, when a multiplication factor of the ligand/SBU stoichiometric ratio is adjusted from 5 to 20, an expected number of ligand connections increases from 10.1 to 11.5. It is calculated through NMR characterization that a lattice defect concentration of the MOF membrane decreases from more than 15% to 3.6% (FIG. 6), and a corresponding actual number of connections increases from 10.1 to 11.5, tending to the perfect coordination of a Zr-fum-MOF membrane, which is consistent with a number of connections predicted by the probability model. The elimination of lattice defects significantly improves a molecular size-sieving ability of lattice pores, and when the multiplication factor of the ligand/SBU stoichiometric ratio is adjusted from 5 to 20, the H$_2$/CO$_2$ permeation selectivity of the Zr-fum-MOF membrane increases from 8.4 to (63.1-66.2) (FIG. 6 and Table 1).

Table 1 H$_2$/CO$_2$ separation performance (transmembrane pressure difference: 1 bar, temperature: 25° C., and mixed molar ratio: 1:1) of Zr-fum-MOF membranes prepared according to different multiplication factors (5, 8, 10, 13, 15, 18, and 20) of the ligand/SBU stoichiometric ratio

TABLE 1

| Multiplication factor | H$_2$ permeation rate (Barrer) | H$_2$/CO$_2$ selectivity |
| --- | --- | --- |
| 5 | 5775.1 | 8.4 |
| 8 | 3658.3 | 10.6 |
| 10 | 2115.2 | 12.1 |
| 13 | 1720.3 | 28.2 |
| 15 | 1181.9 | 63.1 |
| 18 | 1180.1 | 63.4 |
| 20 | 1097.5 | 66.2 |

Figure 7:
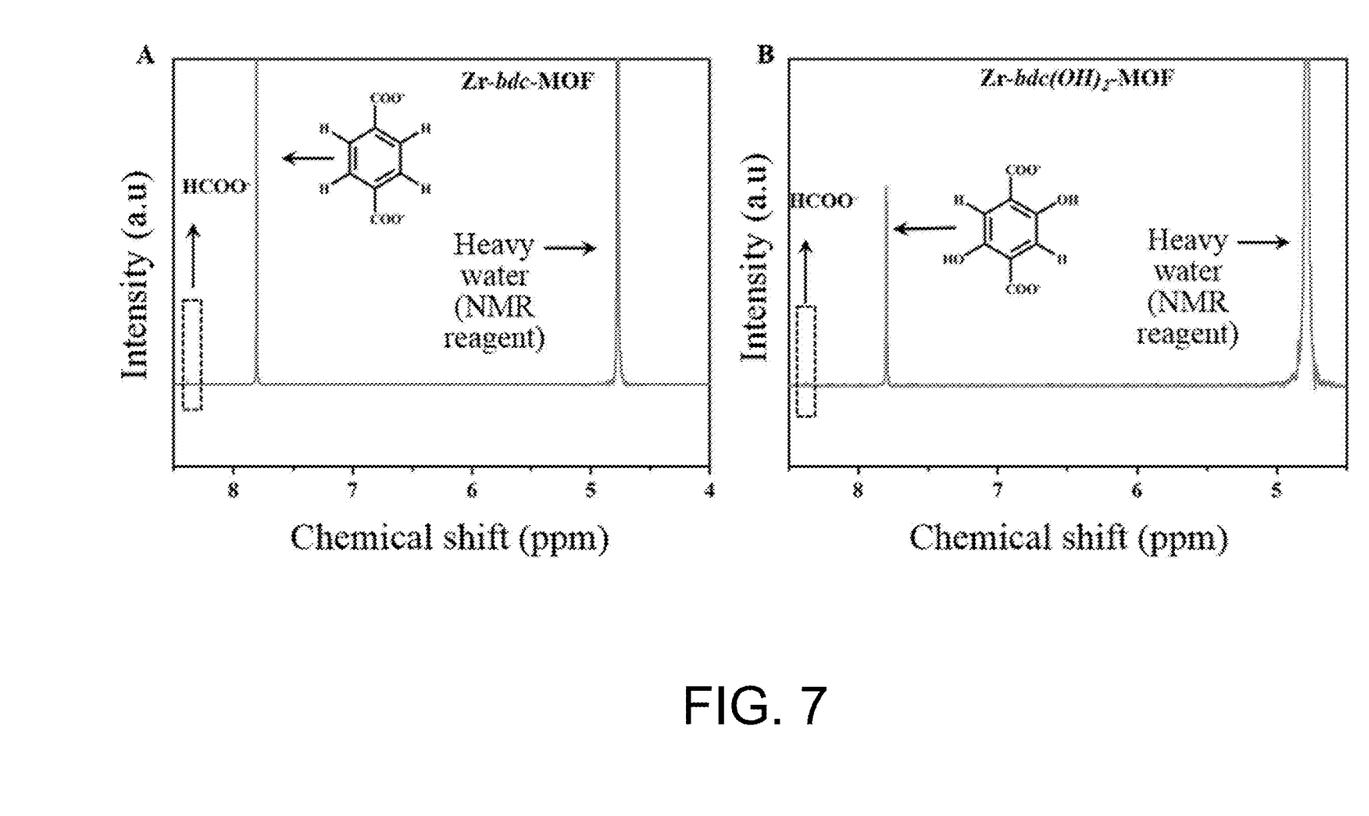
FIG. 7 shows NMR data of Zr-bdc-MOF A and Zr-bdc(OH)$_2$-MOF B membranes prepared at a ligand amount of a multiplication factor of 15 according to the ligand/SBU stoichiometric ratio.

In addition, the high-probability theoretical coordination strategy proposed in the present disclosure can further eliminate lattice defects in two other membranes Zr-bdc-MOF and Zr-bdc(OH)$_2$-MOF, and can reduce a defect concentration to about 2.5%, resulting in a number of connections as high as about 11.7 (FIG. 7).

Figure 8:
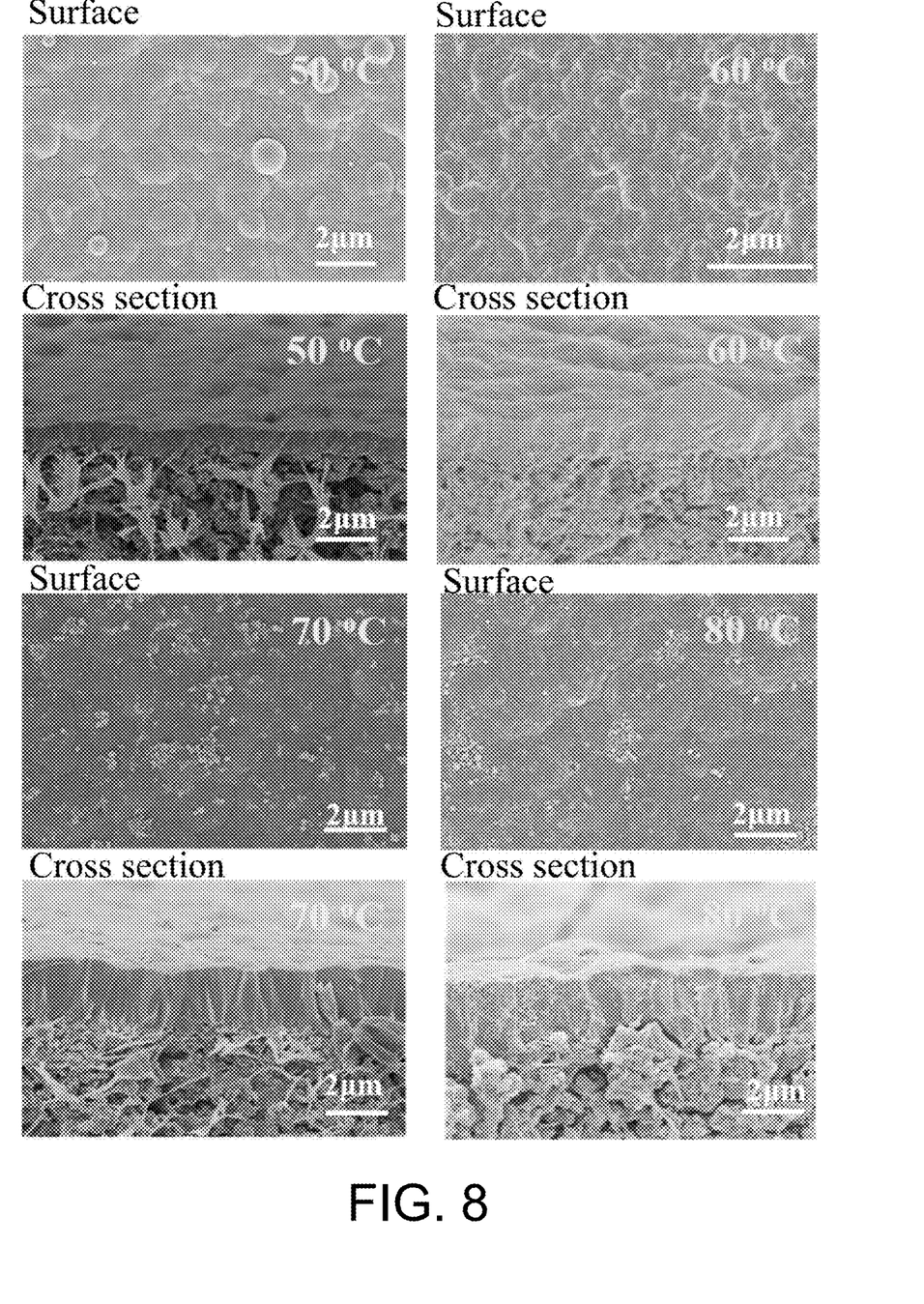
FIG. 8 shows FESEM images of surfaces and cross sections of Zr-fum-MOF membranes prepared at different temperatures at a ligand amount of a multiplication factor of 15 according to the ligand/SBU stoichiometric ratio.
Figure 9:
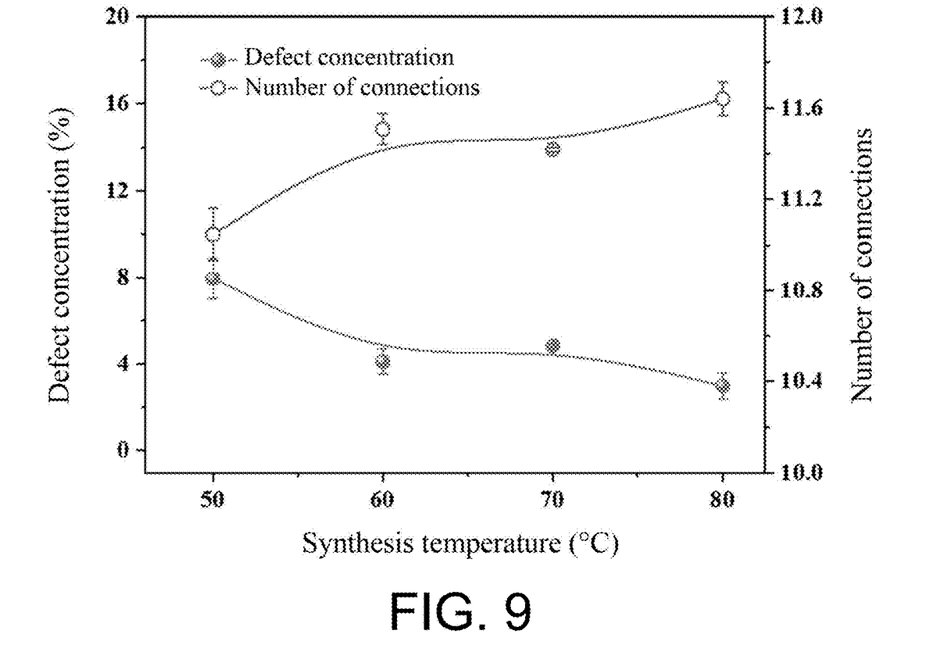
FIG. 9 is a schematic diagram illustrating lattice defect concentrations and corresponding connection numbers (based on NMR data) in Zr-fum-MOF membranes prepared at different temperatures at a ligand amount of a multiplication factor of 15 according to the ligand/SBU stoichiometric ratio.
Figure 10:
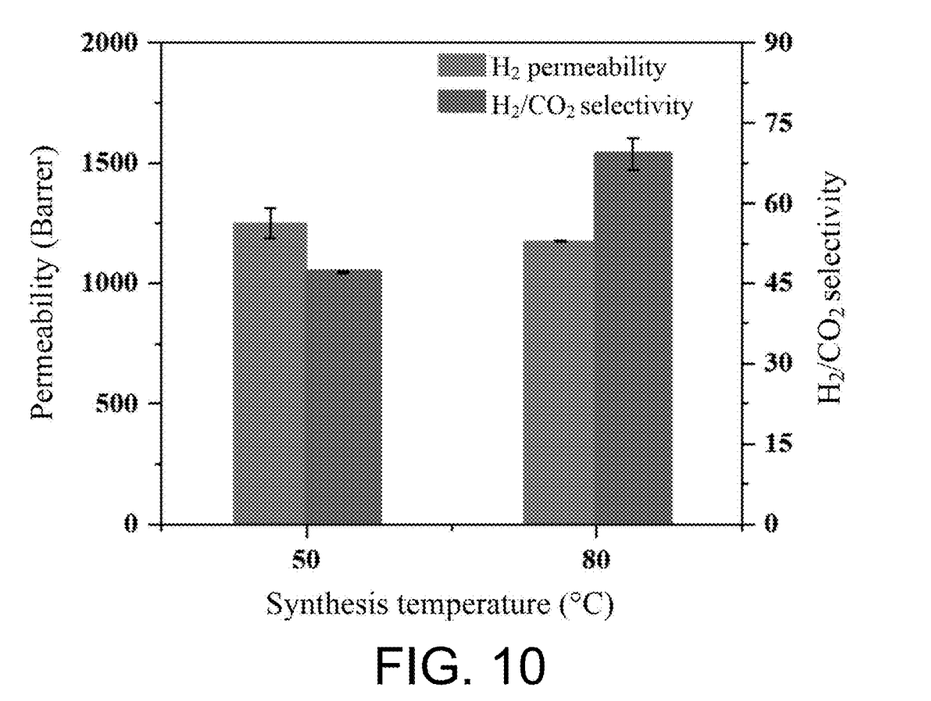
FIG. 10 is a schematic diagram illustrating $H_2/CO_2$ separation performance (single-gas separation performance, pressure: 1 bar, and temperature: 25° C.) of Zr-fum-MOF membranes prepared at 50° C. and 80° C. at a ligand amount of a multiplication factor of 15 according to the ligand/SBU stoichiometric ratio.
Figure 11:
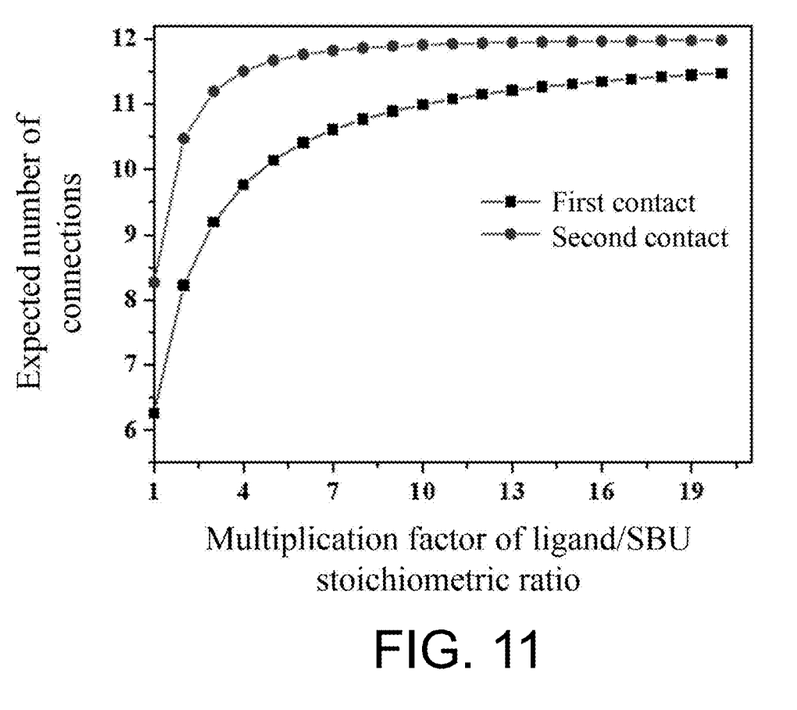
FIG. 11 is a schematic diagram illustrating expected connection numbers of Zr-fum-MOF membranes prepared at ligand amounts of different multiplication factors according to the ligand/SBU stoichiometric ratio, where the expected connection numbers are predicted based on a mathematical model under one and two contacts.

The successful elimination of lattice defects is attributed to the proposed high-probability theoretical coordination strategy, that is, the use of the ligand in excess to increase a probability of contact with coordination sites on SBUs allows perfect coordination. In addition, due to the enhanced Brownian motion, a temperature rise can also increase a probability of contact and is also conducive to overcoming an enthalpy produced by lattice defects. It should be noted that, if a synthesis temperature increases from 50° C. to 80° C., and a ligand is used in an amount that is 15 times a ligand amount according to the ligand/SBU stoichiometric ratio, a lattice defect concentration in a Zr-fum-MOF membrane decreases to about 2.5%, an actual number of connections increases to about 11.7 that is close to the theoretical 12 connections (FIG. 8 and FIG. 9), and a H$_2$/CO$_2$ permeation selectivity increases to 69.2 (FIG. 10), indicating that, after the temperature rise, lattice defects in the MOF membrane are almost completely eliminated. Furthermore, in the proposed probability model, given that a temperature rise can increase a probability of contact between ligands and SBUs (for simplification, a number of contacts is changed from 1 to 2), this result is consistent with the desired 11.95 connections (FIG. 11).

Figure 12:
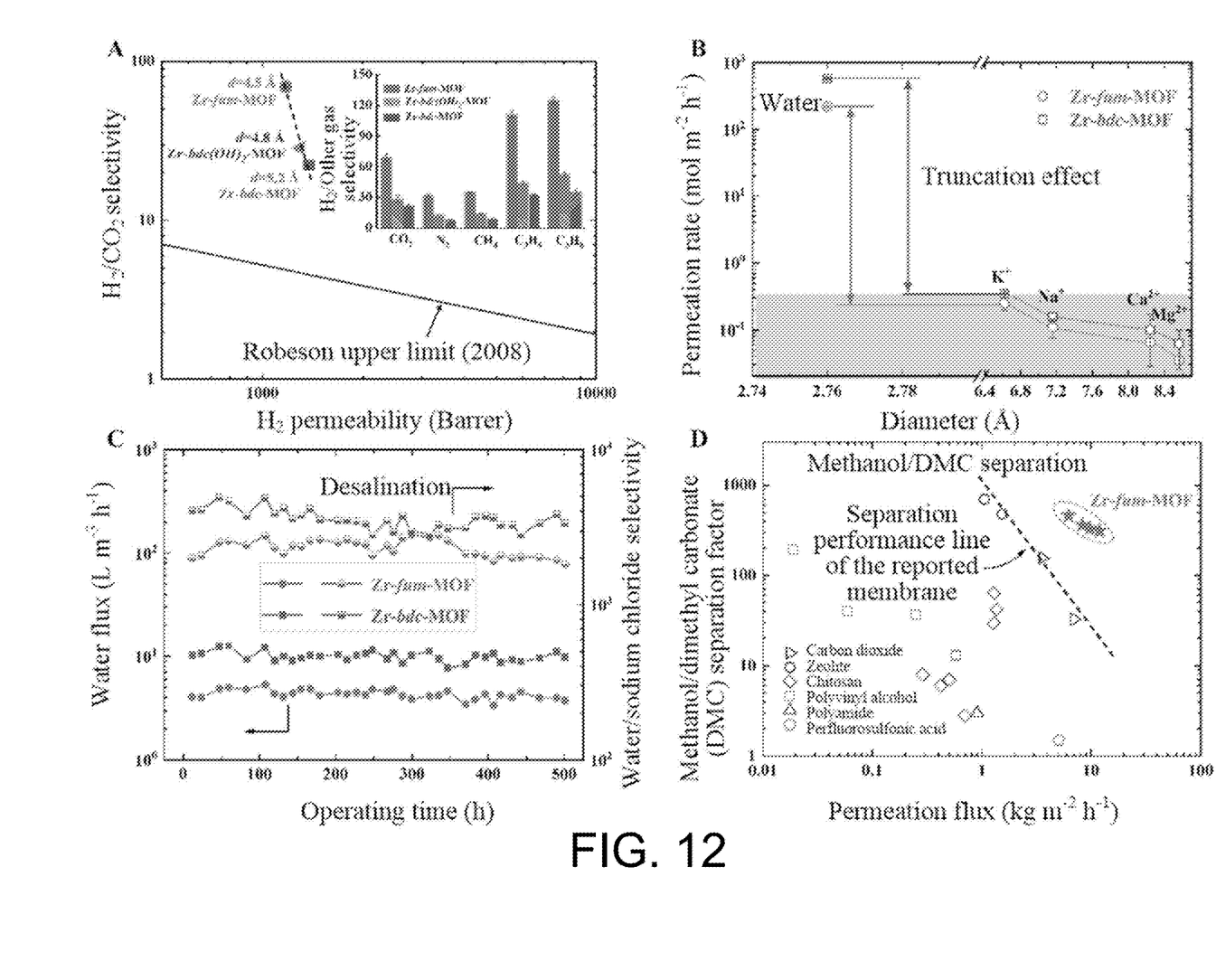
FIG. 12 shows the molecular separation performance of MOF membranes, where A shows the $H_2/CO_2$ separation performance of a Zr-fcu-MOF membrane, a sieving window size can be adjusted by different ligands, and the inset graph shows the permeation selectivities of corresponding $H_2$ for other gases $CO_2$, $N_2$, $CH_4$, $C_3H_6$, and $C_3H_8$ (single-component gas test, pressure: 1 bar, and temperature: 25° C.); B shows the permeability rates of water and different ions through Zr-fum-MOF and Zr-bdc-MOF membranes; C shows the desalination performance of Zr-fum-MOF and Zr-bdc-MOF membranes during a long-term test, and a feed solution is a 3 wt % NaCl solution; and D shows the comparison of performance of methanol/dimethyl carbonate (DMC) separation of a Zr-fum-MOF membrane.

The elimination of lattice defects in an MOF membrane enables accurate molecular sieving based on unique intrinsic lattice pores. The gas sieving performance of each of three Zr-fcu-MOF membranes prepared with a ligand used in an amount that is 15 times a ligand amount according to the ligand/SBU stoichiometric ratio was first systematically evaluated. As shown in A of FIG. 12, the permeation selectivities of the Zr-fcu-MOF membranes for Hz/other gases follow the following law: Zr-fum-MOF>Zr-bdc(OH)$_2$-MOF>Zr-bdc-MOF, which is consistent with sieving pore sizes of the MOFs (Zr-fum-MOF: about 4.5 Å, Zr-bdc(OH)$_2$-MOF: about 4.8 Å, and Zr-bdc-MOF: about 5.2 Å). The results show that the Zr-fcu-MOF membrane without lattice defects can allow accurate molecular separation based on an angstrom-scale intrinsic window. The $H_2/CO_2$ separation performance of these membranes exceeds a Robeson upper limit.

High-connection-number MOF without lattice defects enables the very challenging liquid separation, which cannot be allowed by most MOF membranes due to lack of water or solvent stability. Zr-fum-MOF and Zr-bdc-MOF membranes with different window sizes are selected for seawater desalination, one of the largest liquid separation processes. As shown in B of FIG. 12, permeation rates of ions and water through the two membranes are clearly correlated with a hydration radius and a window pore size. Since a kinetic diameter (2.76 Å) of water is much smaller than a kinetic diameter (larger than 6.6 Å) of hydrated ions, water can pass through the membranes freely, and all ions ($K^+$, $Na^+$, $Ca^{2+}$, and $Mg^{2+}$) are intercepted by an MOF intrinsic window with a maximum pore size of about 4.5 Å to about 5.2 Å. Therefore, the water/salt selectivity is as high as 9,000. In particular, when a feed solution is a 3 wt % NaCl solution (a salt concentration of the solution is almost the same as a salt concentration in seawater), the separation performance of the Zr-fcu-MOF membrane still remains stable after the membrane works continuously for 500 h, which solves the water stability problem of the most-advanced MOF membrane currently available (C of FIG. 12). The excellent water stability can be attributed to near-perfect lattices in the Zr-fcu-MOF membrane. Because an actual number of connections in the MOF membrane prepared according to the high-probability theoretical coordination strategy proposed in the present disclosure is as high as 11.7, the membrane can withstand a water attack in any direction in a 3D space.

Figure 13:
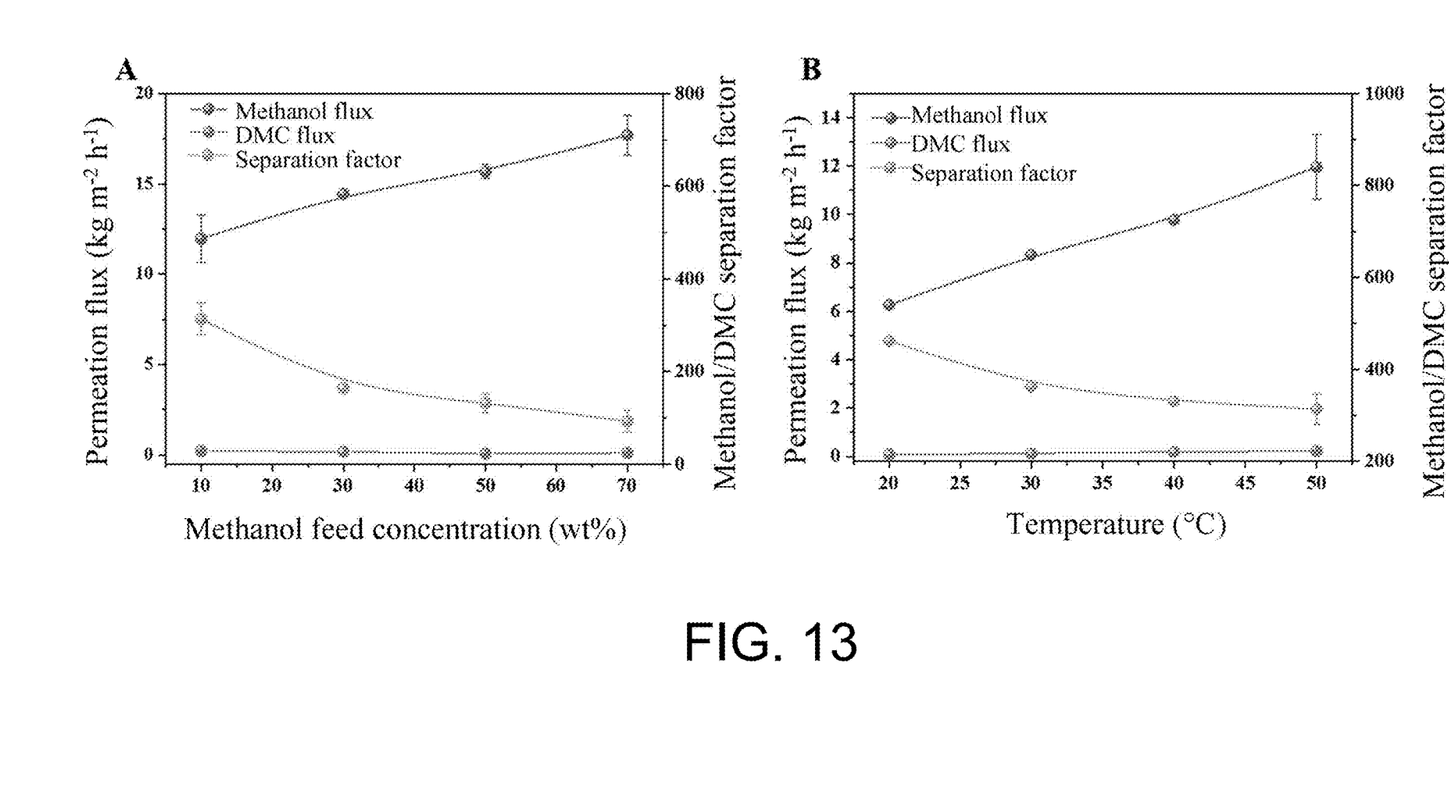
FIG. 13 is a schematic diagram illustrating DMC/methanol separation performance of a Zr-fum-MOF membrane at different feed concentrations (temperature: 50° C.) A and operating temperatures (methanol feed concentration: 10 wt %) B.
Figure 14:
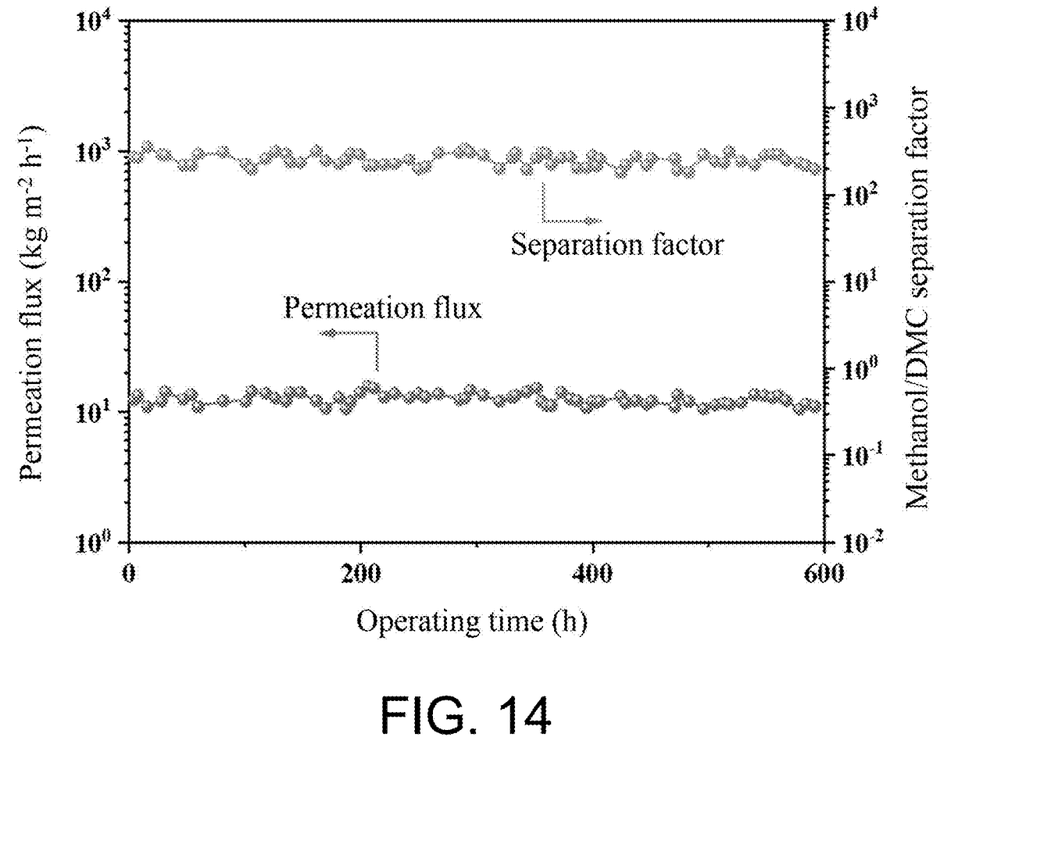
FIG. 14 shows DMC/methanol separation performance of a Zr-fum-MOF membrane during a long-term test (temperature: 50° C., and methanol feed concentration: 10 wt %).

Compared with the application in seawater desalination, the separation of an organic solvent mixture by the membrane still faces great challenges. This is because there is a mutual restriction relationship between a permeation flux and a separation factor (a parameter for evaluating selectivity) of an organic solvent through the membrane and the solvent stability is poor during a separation process of the membrane. Therefore, based on a sieving effect of lattice pores in the MOF membrane, an effect of the highly-stable Zr-fcu-MOF membrane to separate an organic solvent mixture is further explored. A typical example is the purification of DMC. DMC is an eco-friendly solvent widely used in fields such as organic synthesis and lithium batteries. However, the production of DMC is very prone to generation of the by-product methanol, and thus methanol must be removed to obtain high-concentration DMC. However, methanol and DMC can form an azeotropic system, and the traditional separation techniques such as distillation have no advantages when used for separation of methanol from DMC. A lattice window pore size of the Zr-fum-MOF membrane is about 4.5 Å that is exactly between a kinetic diameter of methanol (about 3.8 Å) and a kinetic diameter of DMC (about 4.7 Å to about 6.3 Å), and thus it is expected to allow the efficient separation of DMC/methanol by the membrane. The Zr-fum-MOF membrane exhibits an excellent flux and methanol/DMC separation factor (FIG. 13) in a methanol concentration range of 10 wt % to 70 wt % and an operating temperature range of 20° C. to 50° C., which are superior to separation performance of the most-advanced polymers and inorganic membranes reported currently (D of FIG. 12). Especially for a methanol/DMC (70/30 w/w) azeotropic mixture, the Zr-fum-MOF membrane exhibits a permeation flux as high as 17.71 kg·m$^{-2}$·h$^{-1}$ at 50° C., and allows a purity of methanol at a permeated side to be as high as 99.5 wt %. In addition, the Zr-fum-MOF membrane still retains excellent separation performance after working continuously for 600 h or more (FIG. 14).

What is claimed is:

1. A method for predicting a lattice defect in a metal-organic framework membrane, comprising the following steps:

acquiring a number n of a ligand during preparation of the metal-organic framework membrane, and acquiring a theoretical number m of connections formed between a core secondary building unit and a surrounding secondary building unit;

setting a number of collisions of the ligand with the core secondary building unit and the surrounding secondary building unit; and calculating an expected value of a number of connections formed on lattices based on a collision probability;

wherein the number of collisions is 1 or 2;

when the number of collisions is 1, the expected value of the number of connections is calculated by the following formula:

$$P(k) = \frac{C_m^k C_{n-1}^{k-1}}{C_{m+n-1}^{m-1}}, 1 \leq k \leq m$$

$$E(k) = \sum_{k=1}^{m} kP(k), 1 \leq k \leq m$$

wherein k represents an actual number of connections formed between the core secondary building unit and the surrounding secondary building unit of the metal-organic framework membrane when the number of collisions is 1; and when the number of collisions is 2, the expected value of the number of connections is by the following formula:

$$\tilde{P}(L) = \sum_{k \leq L} P(k)W(k) = \sum_{k \leq L} \frac{C_m^k C_{n-1}^{m-1}}{C_{n+m-1}^{m-1}} \times \frac{C_{m-k}^{L-k} C_{n-1}^{L-1}}{C_{n-k+m-1}^{m-1}}, 1 \leq k \leq L \leq m$$

$$\tilde{E}(L) = \sum_{L=1}^{m} L\tilde{P}(L), 1 \leq k \leq L \leq m$$

wherein L represents an actual number of connections formed between the core secondary building unit and the surrounding secondary building unit of the metal-organic framework membrane when the number of collisions is 2.

2. The method for predicting the lattice defect in the metal-organic framework membrane according to claim 1, wherein the metal-organic framework membrane is formed from an metal-organic framework material.

3. The method for predicting the lattice defect in the metal-organic framework membrane according to claim 2, wherein the metal-organic framework material is selected from a group consisting of IRMOF-series materials, ZIF-series materials, CPL-series materials, MTh-series materials, PCN-series materials, and UiO-series materials.

4. The method for predicting the lattice defect in the metal-organic framework membrane according to claim 3, wherein an n/m ratio is in a range from 0.5 to 50.

* * * * *